(12) United States Patent
I'Anson et al.

(10) Patent No.: US 8,554,244 B2
(45) Date of Patent: Oct. 8, 2013

(54) CONFIGURATION OF MOBILE COMMUNICATION DEVICES

(75) Inventors: Colin I'Anson, Ottery St Mary Devon (GB); Adrian Mark Woodfine-Jones, Cranage (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 890 days.

(21) Appl. No.: 12/449,246

(22) PCT Filed: Jan. 29, 2008

(86) PCT No.: PCT/EP2008/051033
§ 371 (c)(1),
(2), (4) Date: Jul. 30, 2009

(87) PCT Pub. No.: WO2008/092855
PCT Pub. Date: Aug. 7, 2008

(65) Prior Publication Data
US 2011/0312333 A1 Dec. 22, 2011

(30) Foreign Application Priority Data
Jan. 31, 2007 (GB) .................................. 0701777.5

(51) Int. Cl.
*H04W 24/00* (2009.01)
(52) U.S. Cl.
USPC .................. 455/456.1; 455/456.2; 455/456.6; 455/404.2; 455/446; 455/452.2; 455/445; 455/422.1
(58) Field of Classification Search
USPC ............. 455/456.2, 456.6, 404.2, 411, 456.1, 455/414.1, 456.3, 456.5, 566, 446, 422.1, 455/445, 452.2; 705/2; 370/310; 709/227; 371/119

See application file for complete search history.

(56) References Cited

U.S. PATENT DOCUMENTS

| | | | |
|---|---|---|---|
| 6,680,919 B1 * | 1/2004 | Rauhala | 370/310 |
| 6,748,217 B1 | 6/2004 | Hunzinger | |
| 8,019,622 B2 * | 9/2011 | Kaboff et al. | 705/2 |
| 2003/0064731 A1 | 4/2003 | Angelo et al. | |
| 2003/0143988 A1 | 7/2003 | Jamadagni | |
| 2003/0225893 A1 * | 12/2003 | Roese et al. | 709/227 |
| 2004/0023669 A1 | 2/2004 | Reddy | |
| 2004/0072581 A1 | 4/2004 | Tajima | |
| 2005/0026625 A1 | 2/2005 | Gehlot | |
| 2005/0096058 A1 * | 5/2005 | Warner et al. | 455/446 |

(Continued)

FOREIGN PATENT DOCUMENTS

| | | |
|---|---|---|
| CN | 2674801 Y | 1/2005 |
| EP | 0971551 A2 | 1/2000 |

(Continued)

OTHER PUBLICATIONS

Chinese office action mailed Sep. 5, 2012 from serial No. 200880003636.4 filed Jan. 29, 2008.

(Continued)

*Primary Examiner* — Joseph Arevalo

(57) ABSTRACT

A communication system and method is disclosed. The communication system comprises: a mobile communication device configurable to communicate using one of a plurality of communication protocols; and a configuration server. The configuration server is adapted to determine the location of the mobile communication device and to configure a service of the mobile communication device based upon the determined location of the mobile communication device.

17 Claims, 2 Drawing Sheets

(56) References Cited

U.S. PATENT DOCUMENTS

| | | |
|---|---|---|
| 2005/0271011 A1 | 12/2005 | Alemany |
| 2005/0282579 A1 | 12/2005 | Kim |
| 2006/0121914 A1 | 6/2006 | Kim |
| 2007/0296573 A1* | 12/2007 | Schlesier et al. ......... 340/539.13 |
| 2008/0175413 A1* | 7/2008 | Okabayashi .................. 381/119 |
| 2008/0194226 A1* | 8/2008 | Rivas et al. ................ 455/404.2 |
| 2008/0207226 A1* | 8/2008 | Shen et al. ................. 455/456.6 |
| 2008/0261622 A1* | 10/2008 | Lee et al. ................... 455/456.2 |
| 2010/0105396 A1* | 4/2010 | I'Anson ........................ 455/445 |
| 2010/0120405 A1* | 5/2010 | Sapir et al. ................... 455/417 |
| 2010/0198608 A1* | 8/2010 | Kaboff et al. ..................... 705/2 |
| 2012/0027230 A1* | 2/2012 | Okabayashi .................. 381/119 |

FOREIGN PATENT DOCUMENTS

| | | |
|---|---|---|
| EP | 1274264 A1 | 1/2003 |
| EP | 1274264 | 5/2006 |
| EP | 0971551 | 1/2007 |
| WO | WO0145446 | 6/2001 |
| WO | WO2006128479 | 12/2006 |

OTHER PUBLICATIONS

International Search Report mailed Apr. 14, 2008 from Serial No. PCT/EP2008/051033 filed Jan. 29, 2008.

* cited by examiner

CONFIGURATION OF MOBILE COMMUNICATION DEVICES

RELEVANT APPLICATIONS

This Application is a national phase application of International Application No. PCT/EP2008/051033, filed on Jan. 29, 2008, which claims priority of GB Application No. 0701777.5, filed on Jan. 31, 2007, which is hereby incorporated by reference in its entirety.

FIELD OF THE INVENTION

This invention relates to the field of communications, and more particularly to the field of configuring features of a mobile communication device.

BACKGROUND

With the development of communication technology, it is now common for users of communication systems to have a mobile communication device which is adapted to make use of more than one communication service and/or network (for example GSM cellular communications, broadband to home and WLAN in the office). Such communication devices may include wireless (for example cellular) mobile devices, laptop computers and Personal Digital Assistants (PDAs). These communication devices may establish communications over one or more communication networks, such as circuit-switched and packet-based wireless communication networks, using appropriate communication protocols.

Depending on the location of a communication device, particular communication services and networks may be available. Furthermore, location dependent information may be available and/or required for the communication device to make best use of an available communication network/service.

Typically information is 'pulled' on demand by a user of a communication device. This requires the user to be proactive in locating information and/or configuring a communication device in order to use an available communication network/service.

However, most users do not make use of such functionality due to the time and effort required to correctly locate available information and configure the communication device. This is particularly problematic for a user that frequently changes location, since repeated configuration of their communication device would be laborious and time-consuming.

It is therefore desirable to develop an improved communication system which enables a communication device to make use of more than one communication service and/or network, preferably at little or even zero inconvenience to a user of the communication device.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
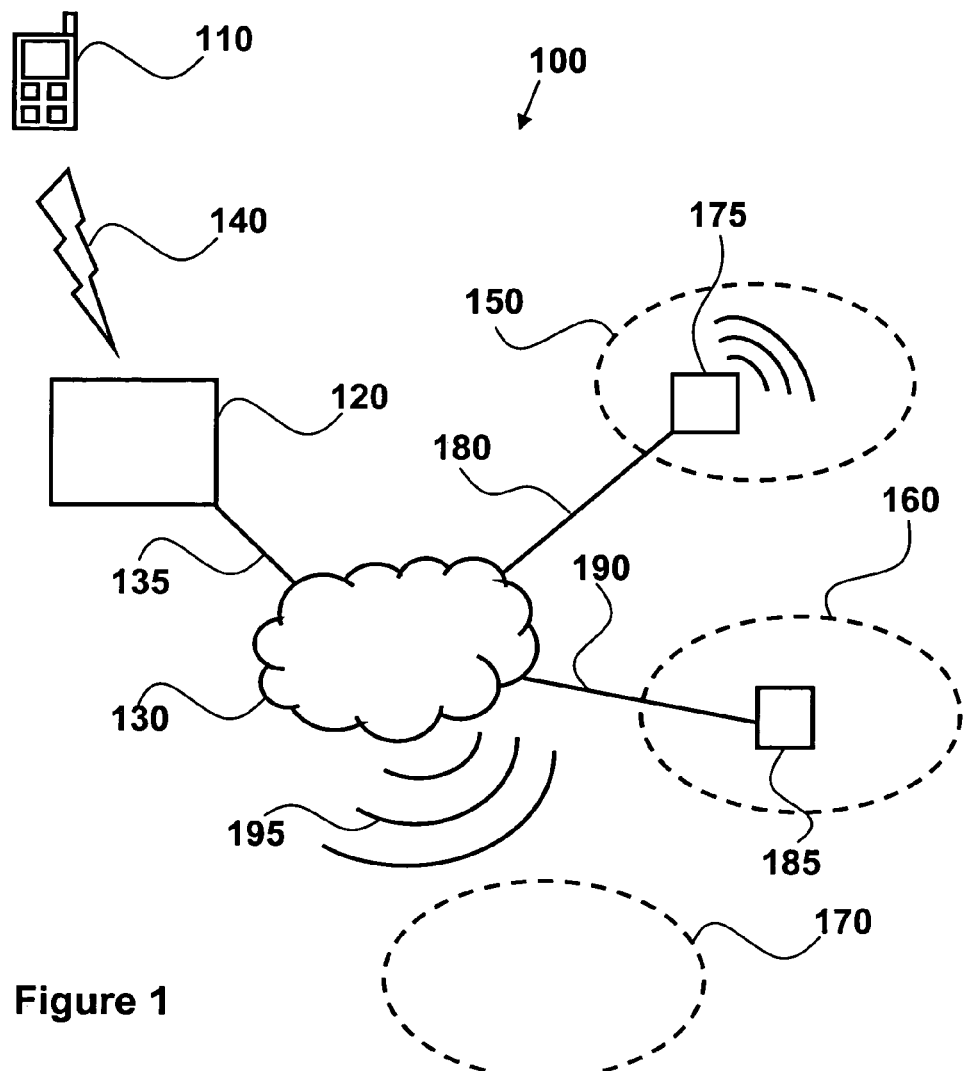
FIG. 1 is a high-level block diagram of a system according to an embodiment of the invention.
Figure 2:
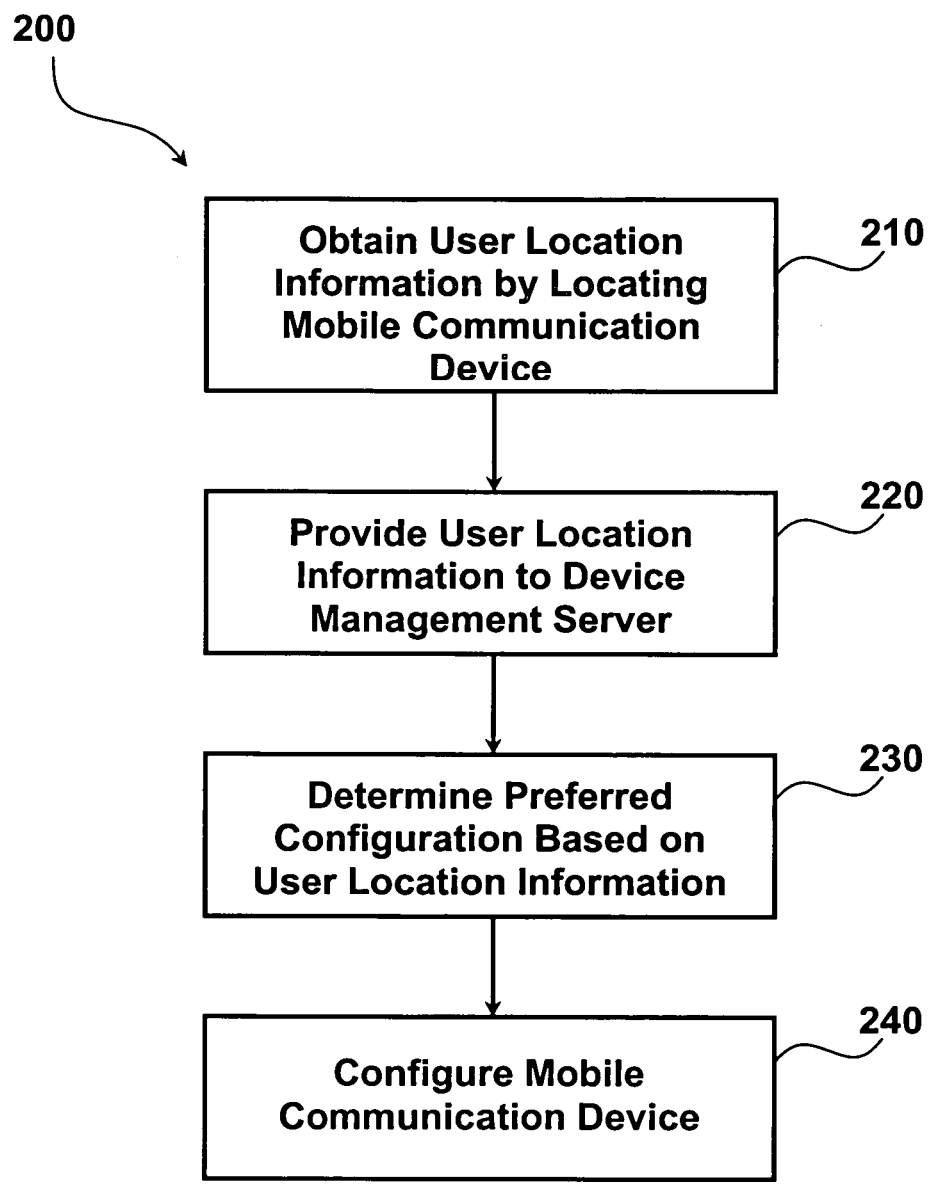
FIG. 2 is an exemplary flow diagram of a method of configuring a mobile communication device according to an embodiment of the invention.

According to an aspect of the invention, there is provided a communication system comprising: a mobile communication device configurable to communicate to one or more networks using one of a plurality of communication protocols; and a configuration server adapted to determine the location of the mobile communication device and to send configuration information to the mobile communication device, the configuration information being based upon the determined location of the mobile communication device. This configuration information may enable the mobile communication device to change the preferred network connection, for example from cellular to wireless LAN connectivity.

According to another aspect of the invention, there is also provided a method of configuring a mobile communication device in a communication system in which a plurality of communication protocols are used for delivering services to the mobile communication device, wherein the method comprises: determining the location of the mobile communication device; and sending configuration information to the mobile communication device, the configuration information being based upon the determined location of the mobile communication device; and configuring the mobile communication device based on the configuration information.

The invention provides a communication system comprising a plurality of terminals, including one or more mobile communication devices, a plurality of communication protocols for delivering calls to the terminals, and a configuration server adapted to determine the location of the mobile communication device. Based upon the determined location of the mobile communication device, the configuration server configures a service of the mobile communication device.

Information about the location of a mobile communication device, and therefore its user, is used to determine the most appropriate or preferred way of delivering a communication service via one or more communication networks. Each communication network may use one or more different communication protocols, for example an Internet protocol (IP) network may use TCP and/or UDP protocols.

At present, it is likely that a typical communication service to be routed by the invention is a telephone call. However, the invention is also applicable to other communication services such as video calls, Short Message Service (SMS) messages, Electronic mail, and other personalized media, to name but a few.

The delivery of the communication service can be made using a choice of appropriate communication protocol (i.e. cellular or Voice over Internet Protocol (VoIP)) and/or communication network (i.e. Public Switched Telephone Network (PSTN), cellular, or VoIP service provider using a broadband internet connection).

The communication service(s) that may be delivered to a mobile communication device can be dependent on a predetermined user preference with respect to the location of the mobile communication device. Assuming that the user carries an associated mobile communication device, and that the mobile communication device therefore goes wherever the user goes, information about the location of the user can be obtained from the mobile communication device. In other words, the mobile communication device may be used to track the movement and/or location of its user. Purely by way of example, such location information can be obtained from the mobile communication device using appropriate techniques such as zone location technologies, Global Positioning Satellites (GPS), triangulation, and cell ID.

Using such location information about the mobile communication device, the configuration server is able to determine and carry out configuration management of the device to enable use of a preferred communication protocol and/or service available. For example, parameters of the device may be changed to ensure that the device will correctly operate at a specific location. Also, power saving measures may be employed by turning on/off specific communication modules of the mobile device according to which communication networks or services are available at the location of the mobile device.

For a better understanding, an example of a communication system according to the invention will now be described with reference to FIG. 1.

The system 100 of FIG. 1 determines the location of a mobile communication device and configures functions of the mobile communication device 110 based upon the determined location of the mobile communication device. To store and process information regarding the location of the user (or their associated mobile communication device), the system 100 includes a routing server 120.

A mobile communication device 110, such as a cellular phone or a PDA, is associated with a user. The user carries the mobile communication device 110 so that it goes wherever the user goes. Thus, when the user moves within the range of a certain communication network, for example a wireless Local Area Network (wLAN) at the office, the mobile communication device 110 also moves within the range of the communication network. Device locating means within the mobile communication device 110 are adapted to detect the location of the device and/or detect that the communication network is available and to inform the configuration server 120 of the determined location of the mobile communication device. It should, however, be understood that the device location could instead be determined by the communication network without requiring device locating means within the device.

The configuration server 120 stores updated information regarding the location of the user in suitable storage means, such as a database or table.

Using such location information about the mobile communication device, the configuration server is able to perform configuration management of the device to enable use of a preferred available protocol/network. Also stored by the configuration server is information relating to user's preference as to which communication protocol, network and/or device functions should be employed when the user is at a particular location. For example, the user may have defined that they prefer to use the mobile communication device to make/receive telephone calls using VoIP over their wireless LAN when at home.

When the configuration server 120 is informed that the user's mobile communication device 110 has moved to a new location, wherein the available communication protocols and/or networks may be different, the configuration server 120 uses information relating to the new location against stored user information and determines the appropriate configuration of the mobile communication device 110.

In other words, the role of the configuration server 120 is to configure the functionality of a mobile communication device 110, the configuration being based upon the determined location of the mobile communication device 110. Further, the choice of appropriate configuration may also be based on additional factors, such as cost, quality of service or any other Service Level Agreement (SLA) parameter.

The configuration server 120 is linked to a communication network 130 via an appropriate communication link 135 (potentially an IP connection over a shared LAN). Whenever a change in location is determined by the mobile communication device 110, updated location information is sent by the mobile communication device 110 to the configuration server 120 via the communication network 140.

Preferably, the configuration server 120 is also in communication with the mobile communication device 110 via a mobile communication network 140 (i.e. cellular network). Using the mobile communication network 140, the mobile communication device 110 sends information about the determined location of the mobile communication device 110 to the configuration server 120. Thus, if the mobile communication device 110 is unable to use the communication network 130 (for example, not within the network coverage range) to provide updated location information to the configuration server 120, the mobile communication network 140 can instead be used.

The most recent location information can be used to determine the location of the mobile communication device 110 if it is in a location that provides poor or no access to a communication network. This overcomes a problem wherein, if the location of a mobile communication device is determined at the time a user first attempts to use a communication service on the device, the location of device cannot be determined because it has no access to a communication network.

First 150 to third 170 user zones are defined at or with respect to particular locations.

In the example shown, the first user zone 150 is an area of wireless network coverage provide by a wireless access point 175, the wireless access point 175 being connected to the communication network 130 via an Asynchronous Digital Subscriber Line (ADSL) link 180. Thus, a mobile communication device having a wireless communication module for communicating via a wireless network may use the communication network 130 when it is within the area of location for the first user zone 150. Here, the first user zone is the user's home.

The second user zone 160 is the user's office of work. The office comprises a VoIP terminal interface 185 (for example, a docking station having an analogue telephone adapter) that is adapted to connect a communication device to the communication network 130 via an IP based office PBX 190. A mobile communication device having a communication module adapted to communicate via the PSTN terminal interface 185 can therefore be linked to the communication network 130 when it is at the second user zone 150.

The third user zone 170 is a wireless hotspot area having access to a wireless communication network link 195 which uses a predetermined communication protocol. Within the third user zone 170, a mobile communication device having a suitable communication module (i.e. a wireless LAN communication module) can make use of the wireless communication link 195 in order to access the communication network 130.

As discussed above, when the mobile communication device 110 is moved to a new location, for example when it enters first user zone 150, the new location is detected and information regarding the detected location is sent to the configuration server 120 (via the mobile communication network 140).

The configuration server 120 uses the received location information to determine how the mobile communication device should be configured. In determining the appropriate device configuration, the configuration server 120 uses stored information regarding the specification of the mobile communication device. The configuration server 120 may also use further factors when determining the most appropriate configuration. These factors can include user defined preferences as to which is the most appropriate device configuration, costing considerations and Quality of Service (QoS) considerations. Although it is likely that the user defined preferences will take into account costing and QoS considerations, it is also envisaged that the configuration server 120 may is overrule the user defined preferences by placing more importance on other factors.

Once it is determined how the mobile communication device 110 should be configured, an appropriate set of instructions is sent to the device (via the same communication network that the location information was sent to the configuration server 120). The set of instructions is adapted to the specification of the mobile communication device 110 and causes the device 110 to be configured as determined by the configuration server 120, for example by activating/deactivating specific functions and changing aspects of the user interface of the mobile communication device 110. Thus, the mobile communication device 110 is automatically configured as required (i.e. to make use of the communication links available at a specific location), without any user intervention.

Of course, the configuration server 120 is not limited to simply modifying the settings or functions of a mobile communication device, but may also provide location-specific information to the phone. For example, information about the location may be provided to the mobile device 110 and automatically communicated to its user via a display of the device.

For a better understanding of the invention, an exemplary scenario in which reconfiguration of a mobile communication device is required will now be described with reference to FIG. 1.

In this example, a user (hereinafter referred to as "UserA") is away from home and the office. In fact, UserA is abroad with a mobile communication device 110 (a mobile phone in this example) in their possession.

The mobile phone of UserA has a wireless communication module that can make/receive calls via a VoIP protocol via a wireless LAN (such as that in the first user zone 150). Of course, the mobile phone 110 can also make/receive calls using a standard cellular communication network, such as that designated by reference 140 in FIG. 1.

Notably, UserA's hotel is adapted to provide a local WLAN hotspot with a communication link to the communication network 130, therefore enabling guests of the hotel to access a communication service of the network 130 using a WLAN enabled device. In other words, the hotel is equivalent to the third user zone 170.

Because the mobile phone 110 is constantly monitoring its location and the available communication networks/links, the mobile phone 110 recognizes when UserA is within the third user zone (wireless hotspot zone at the hotel), and updates the configuration server with the appropriate location information. The configuration server 120 receives the location information and uses it in conjunction with information it holds regarding the specification of the mobile phone.

The configuration server 120 accordingly determines that the mobile phone is able to make use of the available WLAN hotpspot and sends a configuration instruction to the mobile phone which causes the mobile phone to turn on the wireless LAN functionality. Thus, whilst at the hotel, UserA can use the mobile phone to access the communication network 130 via the wireless hotspot without having to manually change any settings of the mobile phone.

Further, when UserA subsequently leaves the hotel, he/she leaves the third user zone 170. The mobile phone detects the change in location and/or available communication links and updates the configuration server 120 accordingly (i.e. by sending location information via the mobile communication network 140).

Accordingly, the configuration sever determines that the mobile phone is no longer able to make use of the wireless communication link 195. The configuration sever 120 then sends a configuration instruction to the mobile phone 110 which causes the mobile phone 110 to turn off its wireless LAN functionality.

When UserA returns home (i.e. UserA enters first user zone 150), the mobile phone detects the change in location and/or available communication links and updates the configuration server 120 accordingly. The configuration sever then determines that the mobile phone able to make use of the ADSL communication link 180 via the wireless access point 175 of the first user zone 150, and sends a configuration instruction to the mobile phone 110 which causes the mobile phone 110 to turn on its wireless LAN functionality and configure it for the home WLAN. This may include using a WLAN identifier and link encryption keys.

Of course, the device configuration server 120 may also be adapted to configure the mobile phone based on other information, such as information relating to the user or status of the mobile phone.

Further, the configuration server 120 may also be adapted to deliver software and other content to the mobile phone based upon its determined location. In this way, configuration parameters, such as the Service Set Identifier (SSID) and cryptographic keys, of the mobile phone's WLAN interface can be changed to ensure that the phone will operate correctly and/or efficiently at a specific location. For example, the configuration server 120 may be adapted to store a list of all the content (i.e. documents and passwords) that a user may require to use at a specific location. This may include generic and user/device-specific information. Depending on the determined location of a device, the configuration sever may send the appropriate information (i.e. passwords) to the device based on the stored list of content. Equally, passwords that are no longer required can be removed.

Of course, information regarding the current content and/or configuration of a mobile communication device may also be provided to the configuration server, so that the configuration server is able to minimize the amount of instructions and content sent to the mobile device. In order to reduce the amount of stored information if such an approach is adopted, the configuration server can also be adapted to delete the stored information when the mobile communication device leaves the location (i.e. when the configuration server is updated with new location information from the mobile device).

It will be appreciated that the invention provides an automatic mobile device configuration arrangement which allows a mobile device to be optimally configured according to the location of the device, wherein little or no involvement from the user of the mobile device is required.

If a user enters a new location, where there are multiple ways to deliver content and/or communication services to a mobile device of the user, the invention can be used to automatically configure the device so that it can make use of the available content and/or services, despite the fact that the user has no knowledge of how the device should be configured. Thus, the invention removes the need for a user to repeatedly reconfigure a mobile communication device as they move between locations.

Also the invention can be arranged to automatically configure a mobile communication device to use the lowest cost or highest quality communication network/link, which a user of the device would otherwise not select due to lack of awareness.

By managing a mobile communication device automatically, an improved range of services can be provided to a mobile communication device at multiple locations. Further, the invention allows for power savings to be made since it can automatically deactivate functions of a mobile device when they are not required.

The invention does not require the user to purchase, install or use special equipment in order to benefit from its advantages.

While specific embodiments have been described herein for purposes of illustration, various modifications will be apparent to a person skilled in the art and may be made without departing from the scope of the invention.

We claim:

1. A communication system comprising:
   a mobile communication device configurable to communicate using one of a plurality of communication protocols; and
   a configuration server to
      determine a location of the mobile communication device,
      determine configuration information for the mobile communication device based on the determined location of the mobile communication device and information relating to a preference defined by a user of the mobile communication device as to a communication protocol, network, or device function to be employed when the mobile communication device is located at a predetermined location, and
      send the configuration information to the mobile communication device to configure a functionality of the mobile communication device,
   wherein the configuration information includes a configuration instruction to turn off a wireless local area network (LAN) functionality of the mobile communication device when the mobile communication device is located outside the predetermined location and another configuration instruction to turn on the wireless LAN functionality of the mobile communication device when the mobile communication device is located at the predetermined location.

2. A communication system according to claim 1, wherein the configuration information comprises a set of instructions to be used within the mobile communication device.

3. A communication system according to claim 2, wherein the set of instructions is executable to change a configuration setting of the mobile communication device when the set of instructions is executed.

4. A communication system according to claim 1, wherein the configuration information sent by the configuration server is further based on information relating to a status of the mobile communication device.

5. A communication system according to claim 1, wherein the configuration server comprises a content unit for communicating electronic content to or from the mobile communication device based upon the determined location of the mobile communication device.

6. A communication system according to claim 5, wherein the content unit is used to communicate the electronic content based on information relating to at least one of: the user of the mobile communication device; and a status of the mobile communication device.

7. A communication system according to claim 1, wherein the mobile communication device comprises a module for establishing the location of the mobile communication device and is adapted to send information relating the established location to the configuration server.

8. The communication system according to claim 1, wherein the preference defined by the user of the mobile communication device includes a preference by the user to utilize a voice over Internet Protocol (VoIP) over a wireless local area network (LAN) when the mobile communication device is located at the predetermined location.

9. A method of configuring a mobile communication device in a communication system in which a plurality of communication paths are usable for delivering services to the mobile communication device, wherein the method comprises:
   determining a location of the mobile communication device;
   determining configuration information for the mobile communication device based on the determined location of the mobile communication device and information relating to a preference defined by a user of the mobile communication device as to a communication protocol, network, or device function to be employed when the mobile communication device is located at a predetermined location; and
   sending the configuration information to the mobile communication device to configure a functionality of the mobile communication device,
   wherein the configuration information includes a configuration instruction to turn off a wireless local area network (LAN) functionality of the mobile communication device when the mobile communication device is located outside the predetermined location and another configuration instruction to turn on the wireless LAN functionality of the mobile communication device when the mobile communication device is located at the predetermined location.

10. A method according to claim 9, wherein the configuration information comprises a set of instructions to be executed within the mobile communication device.

11. A method according to claim 10, wherein the set of instructions is executable to change a configuration setting of the mobile communication device when the set of instructions is executed.

12. A method according to claim 9, wherein the configuration information is further based on information relating to a status of the mobile communication device.

13. A method according to claim 9, further comprising:
    delivering electronic content to the mobile communication device based upon the determined location of the mobile communication device.

14. A method according to claim 13, wherein delivering the electronic content is based on information relating to at least one of: the user of the mobile communication device; and a status of the mobile communication device.

15. A method according to claim 9, further comprising:
    receiving location information of the mobile communication device from the mobile communication device.

16. A non-transitory computer readable medium storing a computer program which, when executed, causes a configuration server to:
    determine a location of a mobile communication device;
    determine configuration information for the mobile communication device based on the determined location of the mobile communication device and information relating to a preference defined by a user of the mobile communication device as to a communication protocol, network, or device function to be employed when the mobile communication device is located at a predetermined location; and
    send the configuration information to the mobile communication device to configure a functionality of the mobile communication device, wherein the configuration information includes a configuration instruction to turn off a wireless local area network (LAN) functionality of the mobile communication device when the mobile communication device is located outside the predetermined location and another configuration instruction to turn on the wireless LAN functionality of the mobile communication device when the mobile communication device is located at the predetermined location.

17. The non-transitory computer readable medium according to claim 16, wherein the configuration information is further based on information relating to a status of the mobile communication device.

\* \* \* \* \*